United States Patent [19]

Collender

[11] Patent Number: 4,547,050
[45] Date of Patent: Oct. 15, 1985

[54] STEREOSCOPIC PICTURES BY ROTATING PROJECTORS

[76] Inventor: Robert B. Collender, 709 Patterson Ave., Glendale, Calif. 91203

[21] Appl. No.: 524,747

[22] Filed: Aug. 18, 1983

[51] Int. Cl.$^4$ .................... G03B 21/32; G03B 35/00
[52] U.S. Cl. ........................................ 352/43; 352/58
[58] Field of Search ................................ 352/43, 58

[56] References Cited

U.S. PATENT DOCUMENTS

| | | | |
|---|---|---|---|
| 3,482,913 | 12/1969 | Glenn | 352/43 |
| 3,501,230 | 3/1970 | Johnston | 352/43 |
| 3,815,979 | 6/1974 | Collender | 352/58 |
| 4,089,597 | 5/1978 | Collender | 352/58 |

Primary Examiner—Monroe H. Hayes

[57] ABSTRACT

My invention is a three-dimensional motion picture capture and reproduction method and apparatus that allows multiple viewers to simultaneously watch the reproduction of recorded or real time 3-D pictures without the need for any special optical aids at their eyes. The playback system is compatible with all current forms of film format, television cameras and video recorders and synthesizes three-dimensional images from several lateral vantage points in the scene. The playback equipment uses a single lamp and a circular and slowly rotating platform upon which several identical projectors are affixed. The angular velocity of each projection lens node and its corresponding image surface is identical to achieve image motion compensation. Multiple images are simultaneously projected in the direction of a concaved screen through the rotation axis or another point closer to the screen. The screen is semi-specular with horizontal reflecting and vertical scatter properties. The screen in conjunction with the rotating projection nodes, generate vertical aerial exit slits in the space between the audience and the screen. Observers view the 3-D scene by means of several vertical lines of the right and left composite pictures scanned simultaneously by several vertical aerial exit slits which generate the whole picture at conventional refresh rates to avoid flicker.

15 Claims, 23 Drawing Figures

SECTION A-A

FIG. 14A

SECTION B-B

STEREOSCOPIC PICTURES BY ROTATING PROJECTORS

CROSS REFERENCES TO RELATED APPLICATIONS

With reference to my previous U.S. Pat. Nos. 4,089,597 dated May 16, 1978; 4,290,083 dated Sept. 15, 1981 and 4,323,920 dated Apr. 6, 1982, my new invention is significantly different. In the old system for both film motion picture and television, the image projected was scanned. An optical scanner moved rapidly past the relatively stationary frame to be projected. In the new system, the projected frame and lens system move at the same rate and at about 1/24th the old rate for the selected embodiment. The old system used a mirror drum that imaged a circular array of frames to be projected, at the drum center. The new system does not employ a mirror drum as the picture is automatically motion compensated by the common angular velocity of both lens and projection frame. The old system projected images originating at the center of rotation. The new system projects images originating at the peripheral rim of the projection system.

BRIEF SUMMARY OF THE INVENTION

My invention relates to a system of recording and stereoscopic viewing of scenes and particularly to a method and means for accomplishing this purpose without viewing aids at the eyes of the observers.

Man has sought for decades to reproduce scenes in stereoscopy without the use of viewing aids at the eyes of the observers and in a manner such that a number of persons might view such scenes at one time and without restriction as to their various individual positions.

I have found that by presenting a relatively large number of related images of the scene to be viewed behind moving vertical pseudo optically generated slit apertures the parallax thus occurring prevents one eye of each observer from seeing what the other eye sees at any and every instant of time. The aperture being in motion, each eye sees a complete image within a short interval of time. I make this interval within the persistence of vision for human observers. The brain fuses the two eye observations into a single stereoscopic view image, as my practical results predicate.

Accordingly, I am able to present a stereoscopic view of a scene to one or any reasonable number of viewers. If any or all of the viewers walk around my apparatus they will see the scene in different aspect, just as though they walked around the same scene in real life.

Considering my system in greater detail, the perspective that one eye of any observer sees is made up of discrete vertical lines of image information taken at discrete instants of time. At these same instants of time the other eye of that observer sees a completely different perspective. The net perspective for the two eyes is different, of course, because the eyes are not coincident in space, but are spaced apart horizontally, as is well known. Considering the image as an entity, it is dissected in time and in space.

An object of my invention is to provide viewing of three dimensional images without the use of viewing aids at the eyes of the observer.

Another object is to provide a stereoscopic system in which various perspectives of the scene viewed may be obtained by changing one's position around the reproducing apparatus.

Another object is to provide a basic stereoscopic motion picture method applicable to known and existing forms of image acquiring processes.

Another object is to provide means for reproducing stereoscopic images that are relatively rugged and are suited to retain adjustment in practice.

Other objects will become apparent upon reading the following detailed specification and upon examining the accompanying drawings, in which are set forth by way of illustration and example certain embodiments of my invention.

DETAILED DESCRIPTION OF DRAWINGS

Figure 1:
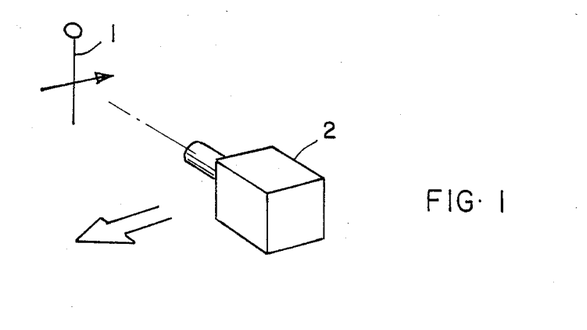
FIG. 1 shows a film or television camera laterally translating with respect to a scene while capturing successive views of the scene to be displayed in the projection system according to my invention.

FIG. 1 shows successive views of object 1 captured by a motion picture film or television camera 2 while the camera is moving with some component of lateral motion with respect to the object.

Figure 2:
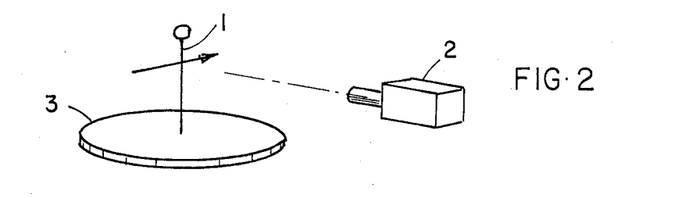
FIG. 2 shows a film or television camera stationary while capturing successive views of a scene on a turntable. The scenes captured are to be displayed in the projection systems according to my invention.

FIG. 2 shows successive views of object 1 on rotating turntable 3 captured by a motion picture film or television camera 2 while the camera is held stationary.

Figure 3:
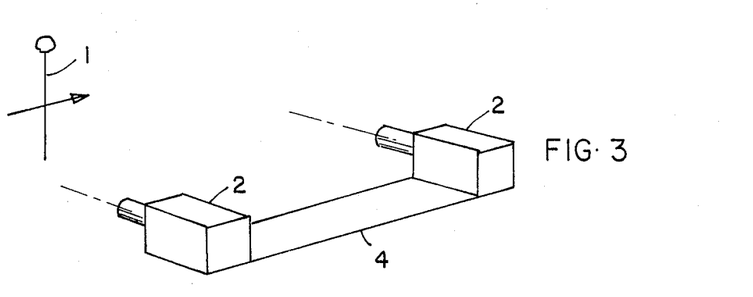
FIG. 3 shows two widely spaced synchronized television cameras with parallel optical axes that have total flexibility in their movement as a unit with respect to the scene. The pictures obtained will be displayed in the projection systems according to my invention.

FIG. 3 shows two television cameras 2 with parallel optical axes and held apart by support 4 while capturing successive views of object 1 in synchronism. This system of capture is used with a receiver processor that adds the missing views that would have been acquired by physical cameras between the two cameras of FIG. 3. For a discussion on the means of transmitting the two views on standard bandwidth, reference my U.S. Pat. No. 4,323,920 dated Apr. 6, 1982. This capture system has the flexibility to remain fixed with respect to object 1 or move in any non-restricted manner with respect to the object.

Figure 4:
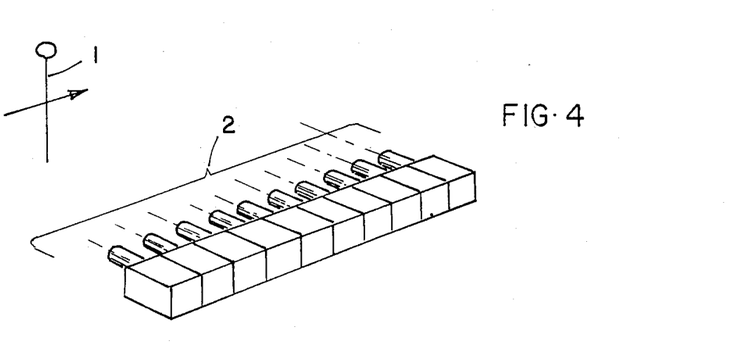
FIG. 4 shows several closely spaced synchronized television cameras with parallel optical axes that have total flexibility in their movement as a total unit with respect to the scene. The pictures obtained will be displayed in the projection systems according to my invention.

FIG. 4 shows a multiple array of television cameras 2 with parallel optical axes operating in synchronism. As with the capture system of FIG. 3, this capture system has the flexibility to remain fixed with respect to object 1 or move in any non-restricted manner with respect to the object. This system is used with closed circuit television or delayed playback from recordings.

Figure 5:
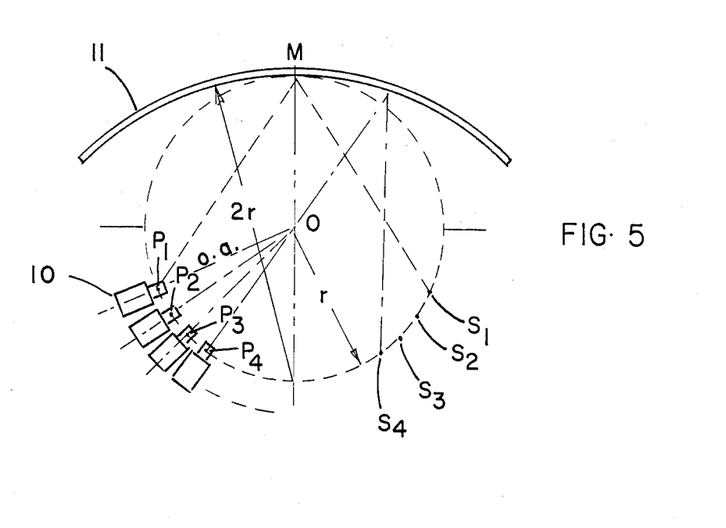
FIG. 5 shows one method of playback projection using a "convexed" cylinder viewing window with multiple projectors and multiple aerial exit slits traveling along the same circular scan locus in opposite directions. The screen size is small with respect to the scan circle size.

FIG. 5 shows a plan view of one embodiment of the projection system for 3-D viewing of motion pictures or television without glasses. Several projectors 10 rotate about center O at radius r while projecting pictures toward O and onto a semi-specular screen 11 with horizontal reflection and vertical scatter properties. For each projector (as $P_1$, $P_2$, $P_3$, $P_4$ etc.), there is a corresponding vertical aerial exit slit (as $S_1$, $S_2$, $S_3$, $S_4$ etc.), that passes through the scan circle at the mirror-image position of the projectors about line OM. Light leaving each projector will enter the exit slit at the same angle as measured from the optical axis of the projector. The optical axes of all projectors are radial put the optical axes of all exit slits are essentially parallel to reference line OM. The screen has a radius about equal to twice the scan circle radius. The projection system of FIG. 5 is referred to as the "convexed" cylindrical window.

Figure 6:
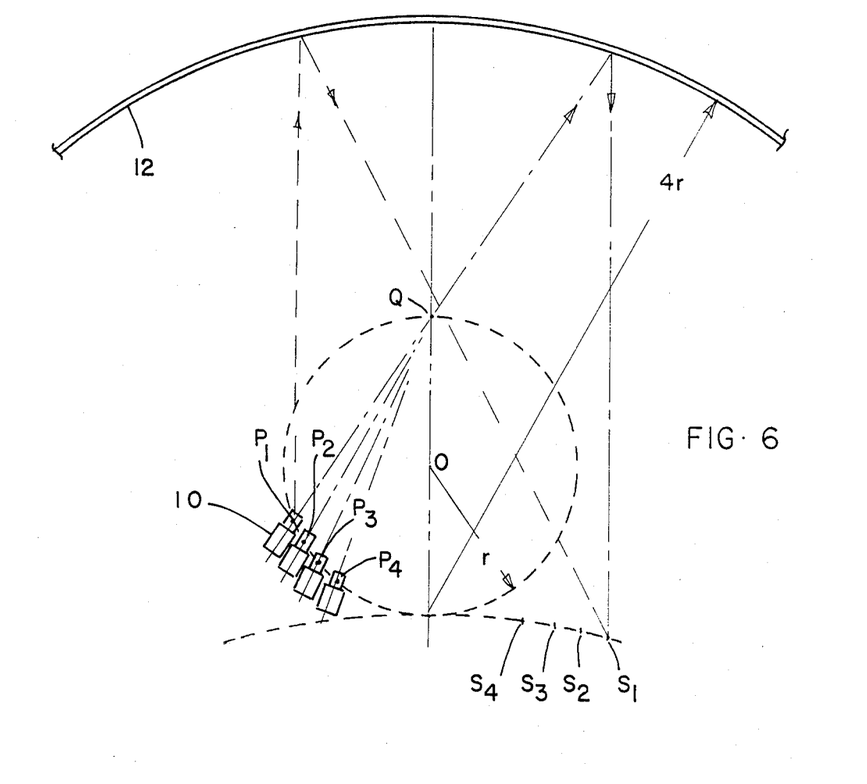
FIG. 6 shows another method of playback projection using a "concaved" cylindrical viewing window with multiple projectors traversing the scan circle and multiple aerial exit slits traveling in the opposite direction along a separate scan path which is concaved to the audience. The pictures are projected through the rim of the scan circle and the screen is large with respect to the scan circle size.

FIG. 6 shows a plan view of another embodiment of the projection system for 3-D viewing of motion pictures or television without glasses. Several projectors 10 rotate about center O while projecting their optical axes through point Q on the rim of the scan circle. The screen 12 is semi-specular with horizontal reflection and vertical scatter properties. The screen radius is about 4 times the radius of the scan circle. Each of the projectors (as $P_1$, $P_2$, $P_3$, $P_4$ etc.), has a corresponding aerial exit slit (as $S_1$, $S_2$, $S_3$, $S_4$ etc.), that lies along a "concaved" slit locus as shown in the figure. The optical axis of all projectors passing through Q will generate parallel optical axes at the corresponding exit slit positions because of the screen 12 reflected light. The projection system of FIG. 6 is referred to as the "concaved" cylindrical window.

Figure 7:
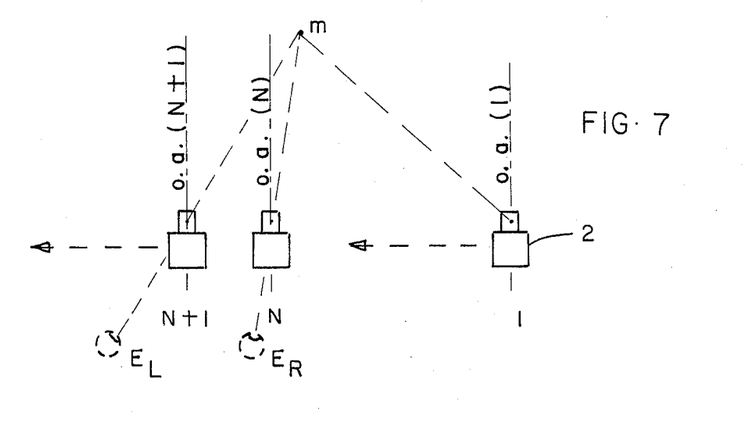
FIG. 7 shows the capture of an arbitrary object point in the scene by a camera traversing a line in front of the object.

FIG. 7 shows a plan view of a scene captured with camera 2 moving to the left through positions 1, n and n+1 with parallel optical axes (o.a.). A point m in the scene is being viewed by imaginary eyes $E_L$ and $E_R$ through the nodes of the camera 2 at positions n+1 and n, respectively.

Figure 8:
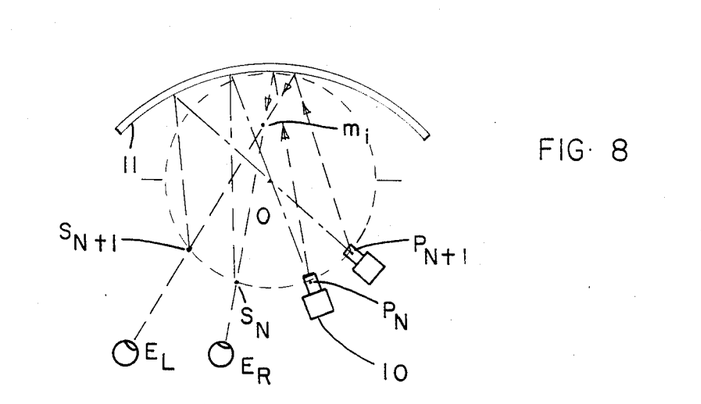
FIG. 8 shows a plan view of the convexed cylindrical window playback and how the object point of FIG. 7 is imaged in the projector for an arbitrary observer's eyes.

FIG. 8 shows a plan view of image playback in the "convexed" cylindrical window system. Multiple projectors 10 at locations $P_N$ and $P_{N+1}$ and other projectors along the scan circle periphery have a spacing less than about one-half of the observer's interoccular separation. The smaller this separation, the more that closer images in the scene-image appear 3-dimensional. If the separation equals the observer's interoccular spacing of 2.5 inches (average) the reproduction would all be 2-dimensional (flat). In FIG. 8, the eyes $E_L$ and $E_R$ (left and right eyes of an observer, respectively) see the image $m_i$ of the object m captured from FIG. 7 through aerial exit slits $S_{n+1}$ and $S_n$ (respectively). The projection system is open continuously (no shutters) and all vertical lines from the scene scan a continuous picture as my practical working model has proven. Since the slit is moving while the image translates parallel to itself, all scene information is made available to every eye observing the scene. In FIG. 8, the central rays passing through the rotation axis and the off-axis rays that carry information about image point $m_i$, are shown.

Figure 9:
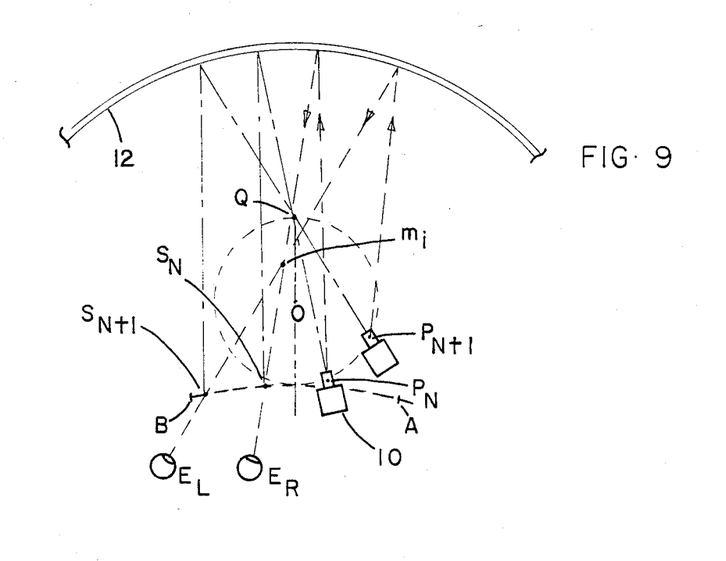
FIG. 9 shows a plan view of the concaved cylindrical window playback and how the object point of FIG. 7 is imaged in the projector for an arbitrary observer's eyes.

FIG. 9 shows a plan view of image playback in the "concaved" cylindrical window system. The difference in the concaved system compared with the convexed system is the larger screen 12 size and the need to project through point Q instead of the rotation axis O. The resultant slit locus corresponding to circular projection scan, is a concaved window from A to B. Although both convexed and concaved projection systems are feasible, for simplicity, the remainder of this specification will discuss the "convexed" system in detail as it applies to either motion pictures or television playback equipment and their relationship to scene capture and is a simpler system to construct.

Figure 10:
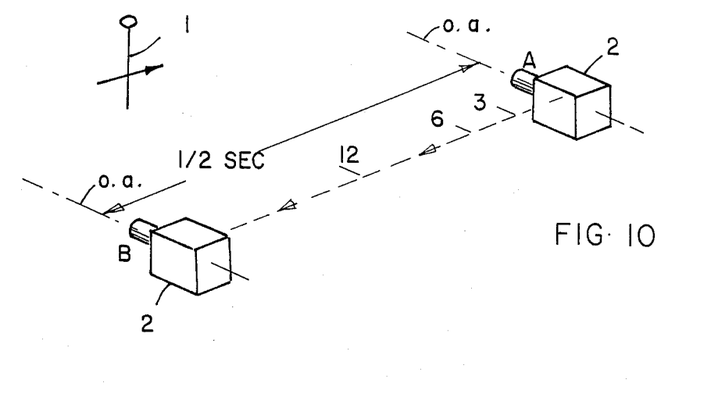
FIG. 10 shows an arbitrary window AB, picture quantity and timing for systems that require a translating camera to generate horizontal parallax for scene playback in the projection system according to my invention.

FIG. 10 shows a translating movie camera 2 successively photographing a scene whose width is arbitrarily identified as AB in which N pictures are captured of the scene object 1 in a given period of time.

Figure 11:
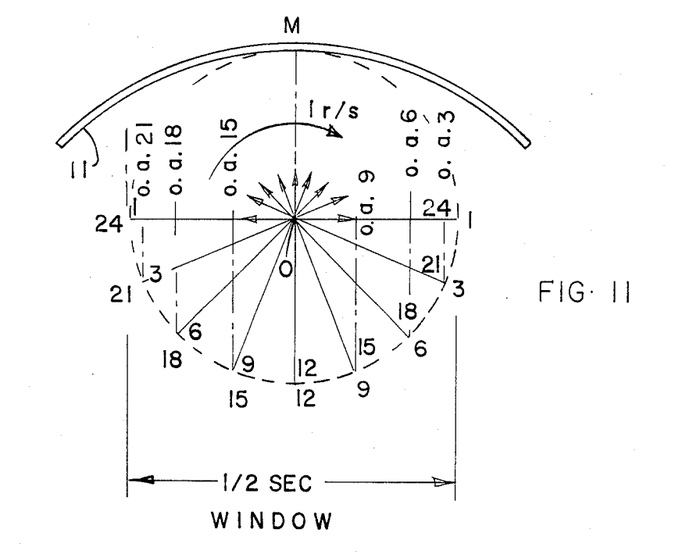
FIG. 11 shows a plan view of the convexed cylindrical window playback system. The window is identified as well as projector and aerial exit slit locations and direction. This figure correlates with the capture system of FIG. 10.

FIG. 11 shows a plan view of a projector where every third projection node is shown for clarity. The node separation should be less than 1.5 inches as mentioned before to assure left and right observer-eye convergence on near scene image points. For simplicity of discussion, a small playback unit of 48 facets (or identical projection nodal points) will be discussed. The screen size will be 29 inches wide by 27 inches high. The film will be 35 mm with the picture pre-rotated in an optical processor by 90 degrees to compensate for horizontally moving film. The film frame size will be 0.625 inches wide by 0.469 inches high. It is understood that any size playback unit could be constructed up to theatre sizes with the number of projector nodes increasing as the size of the unit and screen size increase. A 15 foot by 15 foot screen size would take about 377 projection nodes per scan circle.

A standard motion picture system will usually photograph at 24 frames/second for sound on film and project with a shutter blade to give at least 48 pictures per second to avoid flicker where each picture is projected twice. Since my film embodiment described in simplified form in FIG. 11, uses continuous film motion, it is necessary to repeat frames at 48 per second. The reasonable sized system with the 29×27 inch screen will use 48 lens nodes per scan circle so that the scan circle must rotate 1 rev/sec to avoid flicker. The angular velocity of the film circle and the projector lens nodes are equal and all pictures within the 180 degree projection area in front of the screen (called the viewing port) are continuously projected toward the rotation axis O and onto the screen 11.

The system using relative scene/camera motion if biased for photography from the right hand seat of a moving vehicle, will result in projector nodes and film rotating clockwise as in FIG. 11 plan view. Projection nodes are shown as 1 through 24 on the inner rim of the scan circle and aerial exit slits 1 through 24 on the outer rim of the scan circle. The aerial exit slits appear as mirror images of projection nodes (with reference to line OM) along the scan circle and move in the opposite direction (counter-clockwise) at the same angular velocity as for the projection nodes. The parallel optical axes (o.a.) are shown for every third aerial exit slit.

Although a film system with relative scene/camera motion requires capture from one side only during translation, a television system can sense the image direction and compensate in the receiver to increase system flexibility. This sense system is discussed in my U.S. Pat. No. 4,290,083 dated Sept. 15, 1981.

Figure 12A:
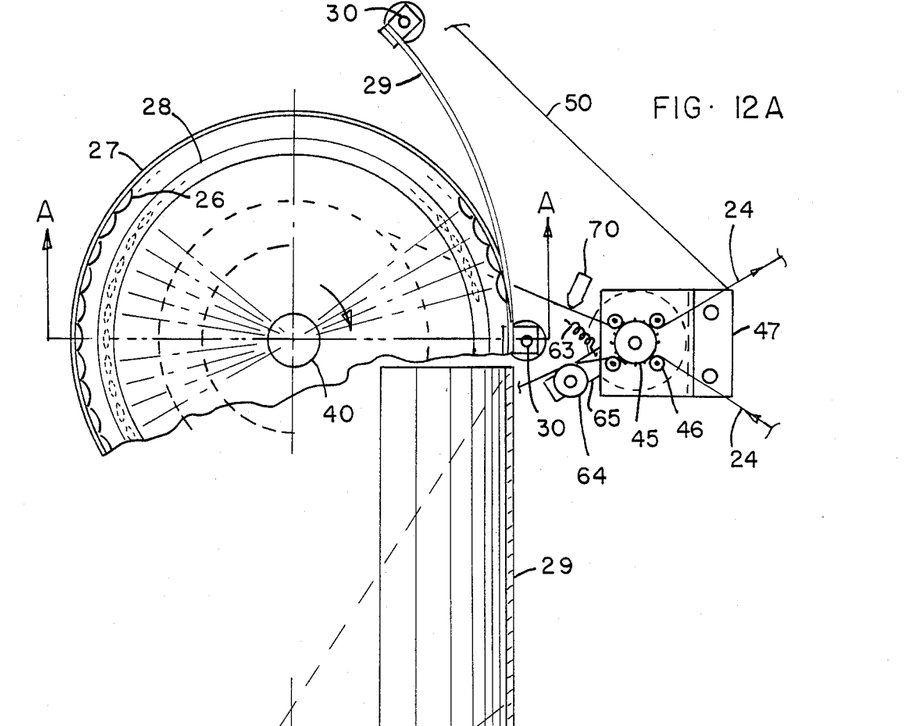
FIG. 12A is a plan view of an embodiment of a film projection system according to my invention.
Figure 12B:
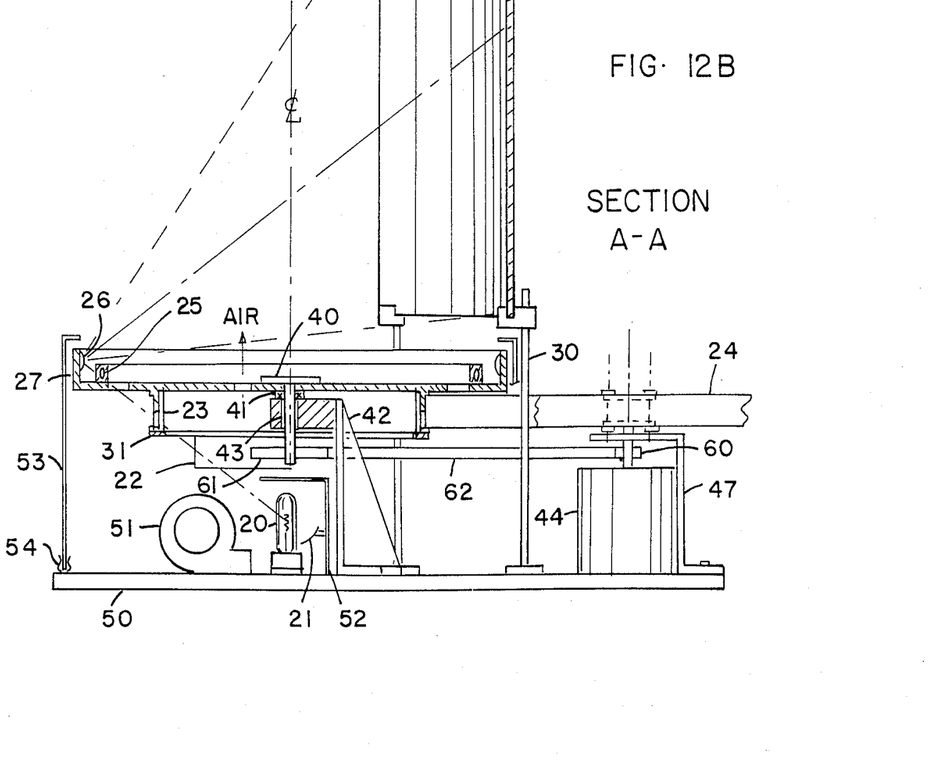
FIG. 12B is a side elevation sectional view taken of section A—A in FIG. 12A.

FIG. 12 is divided into FIG. 12A (the film projection system embodiment plan view for relative scene/camera motion) and FIG. 12B (the side elevation of the same device). FIG. 12B is a section view A—A of FIG. 12A.

In FIGS. 12A and 12B, film 24 is conveyed from a conventional film transport system (not shown) around the circular film guide which is a part of the film guide and optics support 27. The combined feed and take-up sprocket 45 is flanked by the four roller assembly 46. Sprocket 45 is rotated by motor 44 and supported by bracket 47. The combination of motor speed and sprocket teeth assure the proper film speed to expose 48 frames per second to the viewer. The film is locked to the rotating film guide 27 by timing pulleys 60 and 61 and timing belt 62. The ratio is 6/1 for a 32 tooth sprocket 45 which turns a 6 r/s while the film guide 27 containing 48 pictures per 360 degrees, turns at 1 r/s. Film tension is achieved by the tension idler assembly constructed of roller 64, lever arm 65 and spring 63. Film 24 wraps around guide 27 which has been milled with apertures for the film frame areas depicted by shaded areas of FIG. 13. The film pitch is equal to standard 35 mm movie film or 0.75 inches. The film format area is pre-processed to orient the scene by 90 degrees from its original photographed orientation on the film and is reduced in size to 0.469 inch high by 0.625 inch wide to fit between the necessary physical frame dividers on guide 27. This insures structural integrity of part 27.

Figures 13, 14B:
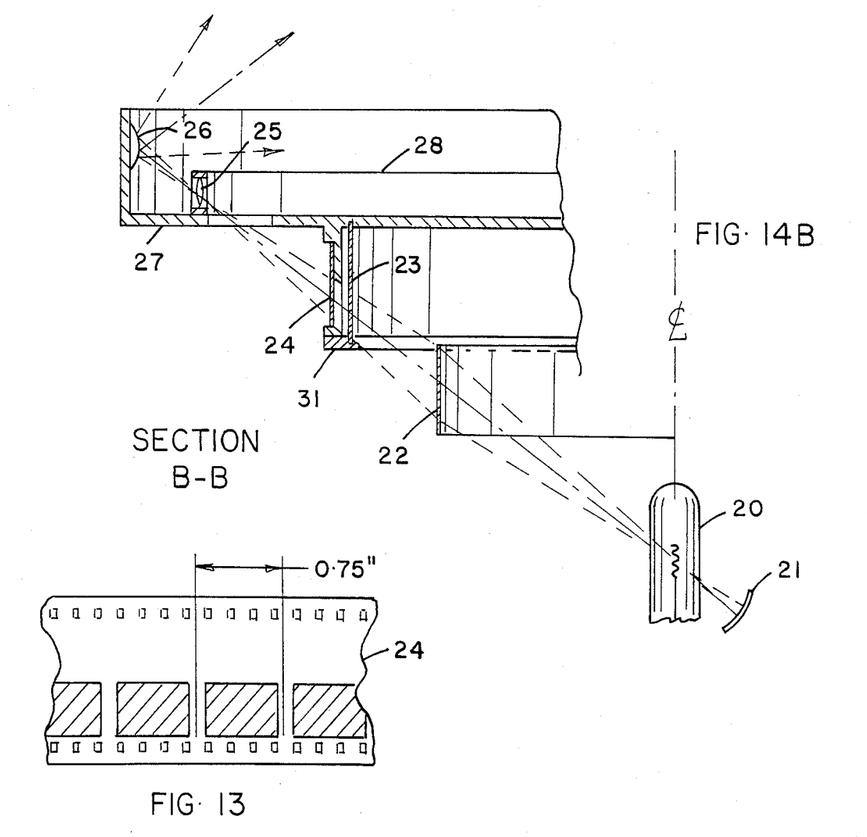
FIG. 13 is a drawing of the 35 mm film picture format allocation to be used in the FIG. 12 embodiment of my invention.
FIG. 14B is a side elevation of one of 48 identical optical projection systems which is part of the FIG. 12 embodiment.
Figure 14A:
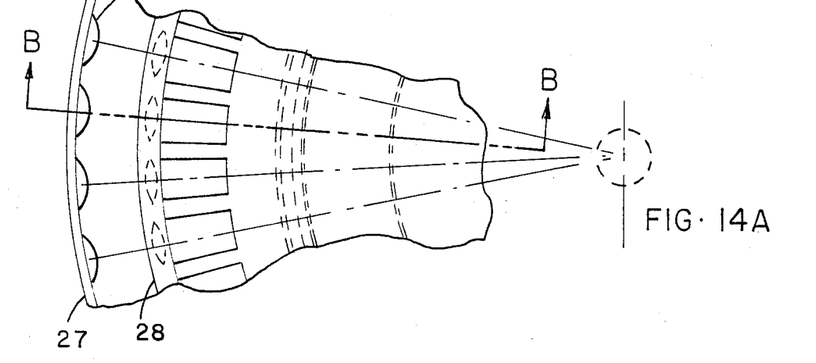
FIG. 14A is a plan view of a partial section of the projection optics showing only three of the 48 proposed lens systems surrounding the rotation axis of the FIG. 12 embodiment.

FIG. 14 is a detailed view of the optics shown in FIGS. 12A and B. FIG. 14 is divided into FIG. 14A (plan view) and FIG. 14B (side elevation). Light begins at lamp 20 and is aided by hemispherical reflector 21, cylindrical Fresnel condensers 22 and 23. The combination images the lamp filament onto relay lens 25 which is one of 48 such lenses retained in lens ring 28. Lens ring 28 is mounted onto film guide 27. In FIG. 14B, lens 25 images the film frame into convexed aspheric reflector 26. Reflector 26 is mounted to the inner surface of the outer rim on film guide 27. From reflector 26, light is diverged in a wide 90 degree horizontal angle to the concaved semi-specular screen 29 (shown in FIG. 29). Lens 23 is held by ring 31.

In order to project continuous 3-D images that appear without the need for special glasses worn by any observer, a given film frame is locked to a given one of the lens nodes. The projection lens node will be formed slightly inside the surface of the convexed reflector 26. Although FIG. 14B shows the projection path for one lens system associated with one frame of film, as mentioned before, there are 48 film frames around the circle, 24 of which occupy a 180 degree sector and 24 of which are being continously projected onto screen 29 of FIGS. 12A and B.

FIG. 14A shows three of the 48 lens systems arrayed around the film guide 27. There are no shutters and all 24 lens systems project their given picture as they arrive within the 180 degree projection sector in front of screen 29. The frame of film for any given lens stays with that lens throughout its 180 degree transit and projects it to the screen continuously. Since all of the projected light to the screen from any one of the 48 projection systems, reflects to a vertical aerial exit slit on the projection node scanning circle, there appears to be no superposition of pictures although at least 24 of them are simultaneously projected. For a description of projection and viewing geometry with the proposed screen, see my U.S. Pat. No. 4,089,597 dated May 16, 1978.

In the case of 3-D television with relative motion between camera and scene, the image appearing on the Charge-Coupled Device imaging surface (see my U.S. 3-D television Pat. No. 4,290,083 dated Sept. 15, 1981) will also stay with its associated lens throughout the 180 degree traverse of the projection lens node. If the 3-D television system uses multiple cameras in the scene capture such as 2 or more, the image surfaces will be updated at a 30 Hertz rate in keeping with the standard television frame rate.

Screen 29 is supported by screen support 30 attached to baseboard 50.

A blower 51 cools lamp 20. Air escapes upward through holes in film guide 27 near the axis of rotation. Light is prevented from escaping and lowering screen contrast by the molded plastic shroud 53 set into clamp 54 at about three places about baseboard 50. Also light baffle and lamp house 52 aid in retaining stray light.

Film guide and optics support 27 is supported by bracket 42 which is attached to baseboard 50. Bracket 42 contains a bushing 43 which receives the shaft from central hub 40. A thrust bearing 41 is arranged between film guide 27 and bracket 42. Shaft 40 accepts timing pulley 61 which was described earlier.

Sound may easily be added to this system as the film is in constant motion. Sound can be either magnetic or optical. A sound head 70 is shown between sprocket 45 and film guide 27 and the timing should correspond with the picture projected from position 12 or half way around the 180 degree scan sector on a line joining screen 29 center with the rotation axis of film guide 27.

Figure 15:
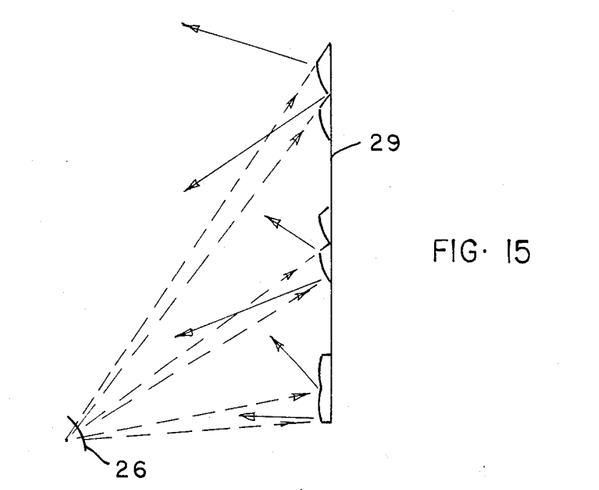
FIG. 15 is a side elevation of the semi-specular concaved projection screen used in the projection system for 3-D viewing without glasses according to my invention. Elemental reflective curved surfaces are greatly enlarged for ease of understanding.
Figure 16A:
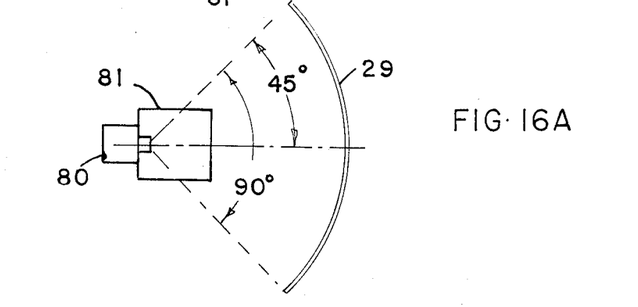
FIG. 16A is a simplified plan view of the projection system utilized for projecting the photographed scene from a standard projector and viewing the picture off-axis by a camera modified with a single lens system as extracted from the FIG. 12 embodiment of my invention in order to easily correct the resultant projection film for the many aberations that occur as a result of off-axis projection, deeply curved screens and wide angle projection.
Figure 16B:
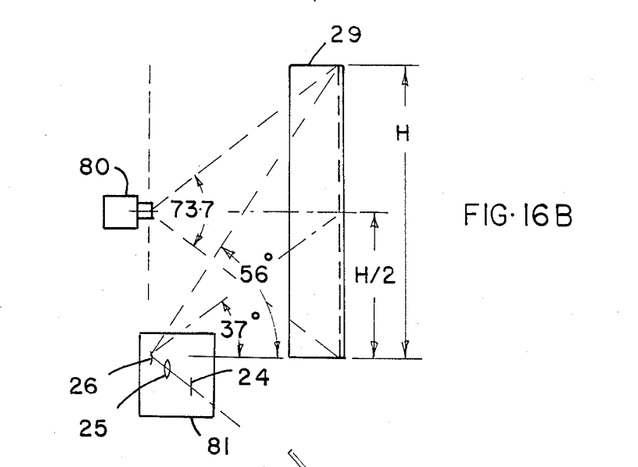
FIG. 16B is a side elevation of FIG. 16A.

Screen 29 as mentioned before and which is described in some detail in my U.S. Pat. No. 4,089,597 dated May 16, 1978, can be horizontally brushed stainless steel. This method however, is not light efficient. Instead a plastic screen can be molded with horizontal ribbed highly reflective curved surfaces. The curvature varies with the location of the horizontal ribbed element along the screen height. FIG. 15 shows a typical screen 29 layout. The screen height subtends a 56 degree vertical angle. This comes about indirectly by the desire to project a 90 degree horizontal viewing angle. The corresponding vertical angle for 3:4 aspect film is 73.74 degrees. FIG. 16 is a construction figure made up of FIG. 16A (plan view) and FIG. 16B (side elevation). Projector 80 and camera 81 are intermediate and not part of the resultant projection system as proposed in the embodiment. From projector 80, a 90 degree horizontal field angle would cover screen 29 vertically as shown if it was placed directly opposite the screen center and on the vertical aerial exit slit which passes through reflector 26. The angle to picture center is 37 degrees and the resultant projection vertical angle to the top of the screen is 56 degrees.

The density of screen segments in FIG. 15 should be about 100 per inch for the closest viewing distance.

One way to reduce the optical problems in correction for deep screen projection, anti-keystone distortion, wide angle projection, off axis projection and a host of other problems, is to simply project the captured scene onto screen 29 from projector 80 of FIG. 16 and utilize a duplicate optical train in intermediate camera 81 as found in the embodiment projector from FIGS. 14A and B and to arrange the shape of reflector 26 to let the screen image fill the selected film frame area in intermediate camera 81. Camera 81 would contain the reflector 26, lens 25 and film 24 as shown in FIG. 16 A and B. Taking the secondary film from this process as the final film to project will remove all anomallies and provide a corrected image.

Figure 17:
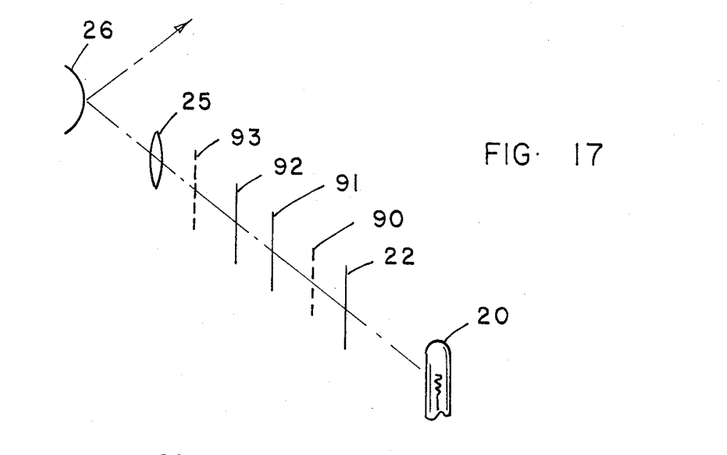
FIG. 17 is an optical system of another but similar embodiment of my invention utilizing electronically generated images as in television by impressing the series of pictures electrostatically onto thermoplastic film. This optical system would then replace the film optical system shown in FIG. 14.

FIG. 17 shows a series of optical components that allow the 3-D projection system to function with electronically generated images on thermoplastic film. For a detail discussion on the application of thermoplastic film to electron beam writing and schlieren projection, reference U.S. Pat. No. 3,044,358 of July 17, 1962 by W. E. Glenn, Jr. Four elements of FIG. 17 are taken from previous FIG. 14B; lamp 20, cylindrical Fresnel lens 22, relay lens 25 and reflector 26. Fresnel lenses 22 and 91 condense light on the thermoplastic film 92 which carries the image to be projected. Lens 91 also images the slits of bar/slit grid 90 on the bars of bar/slit grid 93 in the absense of any charge on the thermoplastic film 92. Film 92 is dimpled by charge deposited by an electron beam (not shown). With dimpling on film 92, light is diffracted around bars in grid 93 and reach the relay lens 25 where the picture is sent to the screen 29 of FIG. 12A and B by means of reflector 26.

Figure 18:
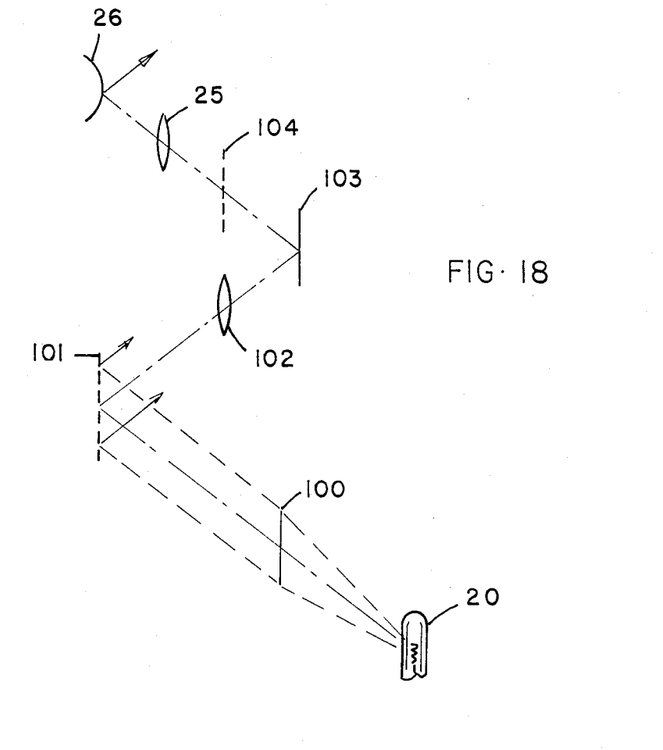
FIG. 18 is an optical system of yet another but similar embodiment of my invention utilizing electronically generated images as in television by impressing the series of pictures electrostatically onto a Charge Coupled Device (CCD) imaging surface overlayed with a reflective polymer film. This optical system would then replace the film optical system shown in FIG. 14.

FIG. 18 shows an alternate method to arrange a series of optical components that allow the 3-D projection system to function with electronically generated images on a Charge Coupled Device (CCD) with reflective polymer membrane. As with the thermoplastic film, the CCD/reflective surface is dimpled by charges at picture element locations that represent scene illumination at that point. For a detailed discussion of CCD applications to projection of pictures, reference U.S. Pat. No. 3,882,271 dated May 6, 1975 by W. E. Glenn Jr. Also reference U.S. Pat. No. 4,227,201 dated Oct. 7, 1980 by J. Grinberg.

Three elements of FIG. 18 are taken from previous FIG. 14B; lamp 20, relay lens 25 and reflector 26. Light from lamp 20 is collimated by Fresnel lens 100. Lens 100 and condenser 102 by way of mirror-bar/slit grid 101, illuminate the picture plane made up of CCD/reflective polymer coat 103. Lens 102 images the slits of the bar/slit grid 101 on the bars of bar/slit grid 104 by way of the reflecting surface of 103 in the absense of picture element charge. When elements of 103 are charged, light is diffracted around the bars in grid 104 to relay the 103 image to reflector 26 via relay lens 25. Reflector 26 sends the light to the screen.

An alternate projection system (not shown) would involve a high brightness CRT with memory at the position of film 24 of FIGS. 14A and B. The high surface brightness of the CRT would allow direct projection of the picture onto the screen. There would be one CRT/memory surface for each lens system as described previously in FIG. 12 for the separate film format for each lens system around the periphery of the rotating lens assembly described as item 27 in FIG. 12

FIG. 17 and FIG. 18 optics would be multiplied 48 times around the center of rotation of the optical system which would rotate at 1 rev/sec. Only one-half of the 48 systems would be active at any given time.

Figure 19:
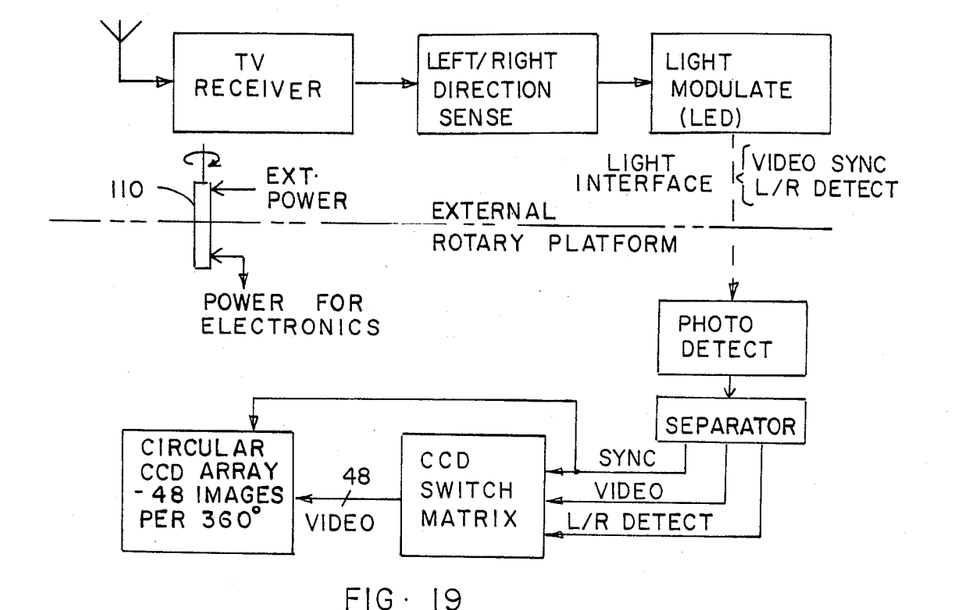
FIG. 19 shows a block diagram of the electronics for a relative lateral motion camera to scene 3-D television system whose purpose is to provide successive captured scenes to the thermoplastic film imager, the Charged Coupled Device imager or other passive or active imaging surfaces which can be used as an agent within the projection system to cause pictures to appear according to my invention.

FIG. 19 shows a simplified block diagram of how the capture system of FIGS. 1 or 2 would be employed to drive the projection system when television cameras are used in place of film cameras. From the camera, the transmitter (not shown) sends a standard television signal to the antenna of the television receiver. The demodulated video and sync are passed through a direction sensing circuit that functions to discern a right or left component of camera/scene motion and sends the composite video with direction information on a light beam from the LED modulator on a stationary base to the photodetector on the rotating lens array similar to item 27 of FIG. 12. For a detailed discussion on the operation of the left/right direction sensor, see my U.S. Pat. No. 4,290,083 of Sept. 15, 1981. Power is sent to the rotator electronics by means of slip ring 110 in FIG. 19. The separator in FIG. 19 separates the three signal components to drive the CCD switch matrix. The switch matrix will selectively pass the successive video television frames to successive lens/CCD imager assemblies arrayed in 48 equally spaced locations around the periphery of the rotating array as in item 27 of FIG. 12. The advantage of this approach to projecting 3-D motion images without glasses by means of a slow speed multi-lens/imager scanner as compared with the high speed scanner and fixed array of imagers described in my U.S. Pat. No. 4,290,083 dated Sept. 15, 1981, is that no intermediate mass memory is required to store 24 frames. Once the image enters the CCD imager, it remains for one-half second while the CCD imager moves through the 180 degree viewing port as described for FIG. 12 in this specification.

Figure 20:
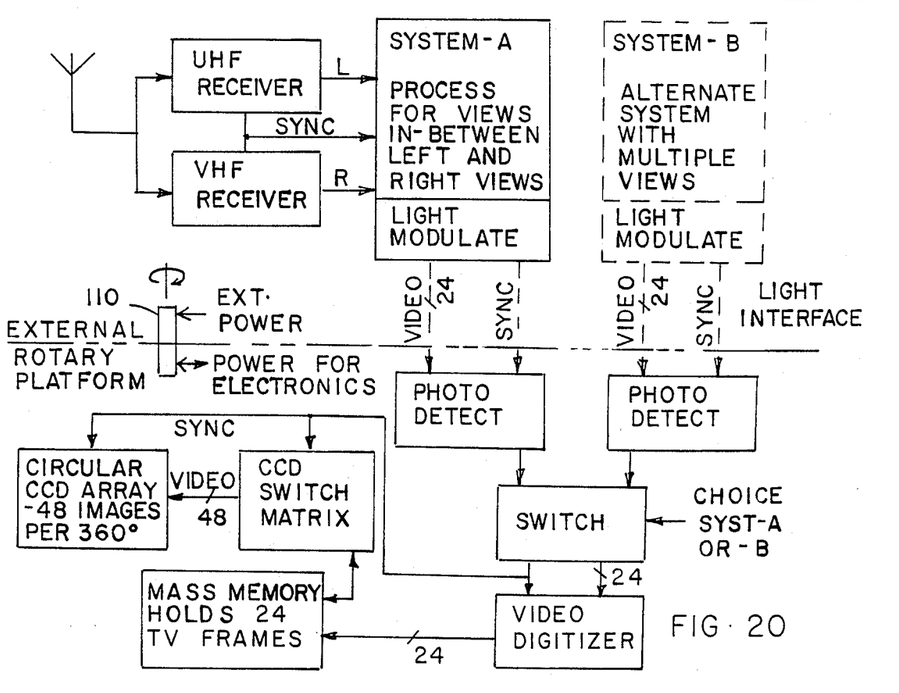
FIG. 20 shows a block diagram of the electronics for a 3-D television system whose purpose is to provide captured television frames to the imaging devices (such as Charge Coupled Device with reflective polymer film) from multiple captured views or views synthesized in conjunction with capturing only two views. These views can then be used as an agent within the projection system to cause pictures to appear according to my invention.

FIG. 20 shows a simplified block diagram of how the capture systems of FIGS. 3 and 4 would be employed to drive the projection systems A or B when television cameras are used in place of film cameras. Using system A, the dual cameras of FIG. 3 provide two images. One image is telecast on VHF and the other on UHF. These two images (right and left, respectively) are widely separated at about the width of the television receiver projection window of about 2 feet in this case. The in-between views, not telecast, will be synthesized in the receiver. The processor for this in FIG. 20 is described in detail in my U.S. Pat. No. 4,323,920 dated Apr. 6, 1982.

The 24 video signals resulting from the in-between missing image processing of FIG. 20, are sent by light beams to photo detectors on the lens/CCD image rotator (similar to item 27 of FIG. 12). External power is conveyed to device electronics on the rotator by slip ring 110 in FIG. 20.

The choice switch of FIG. 20 allows the operator to select whether system A or B will be displayed. System A has just been discussed. System B uses the multiple camera approach of FIG. 4. System A is practical for compatible television transmission for home use but system B would require excessive bandwidth due to multiple channels. Therefore system B can be used in closed circuit 3-D television or the 24 multiple images could be recorded for delayed playback.

The video digitizer of FIG. 20 converts the analog television signals into digital format so that the mass-memory (RAM, magnetic disc, optical read/write disc, etc.), can store 24 television frames. Storage is necessary because as any one lens/image combination rotates to occupy the next lens/image combination on the rotating platform similar to item 27 on FIG. 12, the television field presented by the first pass will change to the next television field for the adjacent lens/imager combination passing the same arc sector of 360 degrees divided by 48 or 7.5 degrees. This action is achieved by selectively passing the proper 24 fields in parallel from mass memory to the CCD circular array via the CCD switch matrix of FIG. 20. For a discussion of a CCD switch matrix and CCD array, see my U.S. Pat. No. 4,290,083 dated Sept. 15, 1981.

It should be noted that computer graphics can be added to the playback equipment allowing a group of people to simultaneously view the 3-D presentation without the use of glasses. With the addition of a microprocessor and image loading algorithms for the active 24 image array in the view port, any types of graphics can be developed with full color, hidden line removal, shading, motion and with depth unlimited.

Having thus fully described my invention and the manner in which it is to be practiced, I claim:

1. A method of recording and reproducing stereoscopic viewing for observation by observers without visual aids at the eyes of the observers, comprising:
  a. capturing several views from different lateral points;
  b. placing the several views obtained in several projection systems arranged around the periphery of a rotating multiple projection device;
  c. relating a given view to a given projection system;
  d. projecting a plurality of the given views simultaneously onto a screen from the periphery of said rotating projection device; and
  e. causing said screen to reflect light horizontally and scatter light vertically to provide a vertical aerial exit slit for each projection system between the observers and said screen;
  whereby simultaneous viewing by an observer of several aerial exit slits in a given interval of time generates stereoscopic pictures for said observer.

2. The method of claim 1, wherein the view projected by any one projection system does not change during transit over the field of view of said projection system.

3. The method of claim 2, wherein the frequency of views observed in any one aerial slit is at least 48 times per second.

4. The method of claim 1, wherein the view projected by any one projection system changes during transit over the field of view of said projection system.

5. The method of claim 4, wherein the frequency of views observed in any one aerial slit is at least 60 times per second.

6. Apparatus for displaying motion pictures stereoscopically to observers situated in front of a viewing screen, said apparatus including;
  a. a rotating platform containing multiple projectors arranged around the periphery of said platform;
  b. each said projector having an image format;
  c. means moving said platform, multiple peripheral projectors and image format moving at the same angular velocity;
  d. means to sense the change in picture element characteristics within said image format;
  e. means to direct images from said image format through the optics of each projector;
  f. said image format being of sufficient brightness to cause a visible image to appear on said screen when projected by any of said peripheral projectors;

g. said screen being a concaved semi-specular screen having horizontal reflection and vertical scatter properties;

whereby the magnified reflected image format from each projector appears through a horizontally moving vertical aerial exit slit between observers and said screen.

7. The apparatus of claim 6, wherein each of said projectors projects the central image format ray of each projector image through the rotation axis of said platform.

8. The apparatus of claim 6, wherein each of said projectors projects the central image format ray of each projector image through a point between the screen and the rotation axis of said platform.

9. The apparatus of claim 6, wherein the picture element characteristics within each said image format comprises film with picture elements varying in light transmission and color.

10. The apparatus of claim 6, wherein the picture element characteristics within each said image format comprises depressions in a reflective or transmissive medium that diffract light.

11. The apparatus of claim 6, wherein the picture element characteristics within each said image format comprises a light emitting device, such as a cathode ray tube.

12. The apparatus of claim 6, wherein each said projector comprises a Schlieren device adapted to project diffracted light around bar/slit grids onto the screen.

13. The apparatus of claim 6, wherein each said projector is adapted to project a self-luminous image format onto the screen.

14. The apparatus of claim 6, wherein said screen comprises a horizontal brushed piece of stainless steel.

15. The apparatus of claim 6, wherein said screen comprises specular shaped embossed cylindrical ribs extending horizontally.

* * * * *